United States Patent
Craft et al.

(10) Patent No.: US 11,389,771 B2
(45) Date of Patent: Jul. 19, 2022

(54) ASYMMETRIC COMPOSITE MEMBRANE AND A METHOD OF PREPARATION THEREOF

(71) Applicant: HYDROXSYS HOLDINGS LIMITED, Auckland (NZ)

(72) Inventors: Lenka Benacek Craft, Auckland (NZ); Mark Exley, Auckland (NZ); Ashveen Vikash Nand, Auckland (NZ); Dylan Townshend Gifford, Auckland (NZ)

(73) Assignee: HYDROXSYS HOLDINGS LIMITED, Auckland (NZ)

(*) Notice: Subject to any disclaimer, the term of this patent is extended or adjusted under 35 U.S.C. 154(b) by 283 days.

(21) Appl. No.: 16/338,786

(22) PCT Filed: Oct. 3, 2016

(86) PCT No.: PCT/IB2016/055899
§ 371 (c)(1),
(2) Date: Apr. 2, 2019

(87) PCT Pub. No.: WO2017/056074
PCT Pub. Date: Apr. 6, 2017

(65) Prior Publication Data
US 2020/0346170 A1    Nov. 5, 2020

(51) Int. Cl.
*B01D 69/10* (2006.01)
*B01D 69/12* (2006.01)
*B01D 71/26* (2006.01)
*B01D 71/52* (2006.01)
(Continued)

(52) U.S. Cl.
CPC ........... *B01D 69/125* (2013.01); *B01D 69/02* (2013.01); *B01D 69/105* (2013.01); *B01D 71/26* (2013.01);
(Continued)

(58) Field of Classification Search
CPC .... B01D 69/125; B01D 69/02; B01D 69/105; B01D 71/26; B01D 71/38; B01D 71/52;
(Continued)

(56) References Cited

U.S. PATENT DOCUMENTS

| 4,678,813 A * | 7/1987 | Itoh .................... B01D 67/0088 210/500.23 |
| 2006/0121217 A1 | 6/2006 | Childs et al. |
| 2013/0026091 A1 | 1/2013 | Farr et al. |

FOREIGN PATENT DOCUMENTS

| WO | 2005/120701 | 12/2005 |
| WO | 2007/135689 | 11/2007 |

(Continued)

OTHER PUBLICATIONS

Gohil et al, Polyvinyl alcohol as the barrier layer in thin film composite nanofiltration membranes: Preparation, characterization, and performance evaluation, Journal of Colloid and Interface Science, vol. 338, Issue 1, Oct. 1, 2009, pp. 121-127. (Year: 2009).*

(Continued)

*Primary Examiner* — Pranav N Patel
(74) *Attorney, Agent, or Firm* — Nixon & Vanderhye (57) ABSTRACT

Asymmetric composite membranes and methods for their preparation are disclosed. The membranes comprise a cross-linked poly(vinyl alcohol) polymer coated on a film of cross-linked sulfonated poly(ether ether ketone) adhered to a sheet of hydrophilicitized microporous polyolefin. The microporous polyolefin is typically microporous poly(ethylene). The membranes have improved selectivity with the regard to the rejection of solutes in reverse osmosis and ultrafiltration applications.

10 Claims, 7 Drawing Sheets

(51) Int. Cl.
*B01D 69/02* (2006.01)
*B01D 71/38* (2006.01)

(52) U.S. Cl.
CPC ............ *B01D 71/38* (2013.01); *B01D 71/52* (2013.01); *B01D 2323/02* (2013.01); *B01D 2323/30* (2013.01); *B01D 2323/345* (2013.01); *B01D 2323/36* (2013.01); *B01D 2323/385* (2013.01); *B01D 2325/022* (2013.01)

(58) Field of Classification Search
CPC ............ B01D 2323/02; B01D 2323/30; B01D 2323/345; B01D 2323/36; B01D 2323/385; B01D 2325/022; B01D 2323/38; B01D 2325/14; B01D 69/12; A23C 9/142
See application file for complete search history.

(56) References Cited

FOREIGN PATENT DOCUMENTS

| WO | 2010/106021 | | 9/2010 |
|---|---|---|---|
| WO | 2015/147657 | | 10/2015 |
| WO | WO2016081729 | * | 5/2016 |
| WO | 2016/103239 | | 6/2016 |

OTHER PUBLICATIONS

Kai Pan et al, Interfacially polymerized thin-film composite membrane on UV-induced surface hydrophilicmodified polypropylene support for nanofiltration, Polym. Bull. (2014) 71:415-431. (Year: 2014).*
Hilal et al, Photochemical modification of membrane surfaces for (bio)fouling reduction: a nano-scale study using AFM, Desalination 158 (2003) 65-72. (Year: 2003).*
Tapiero et al, Ion-selective interpenetrating polymer networks supported inside polypropylene microporous membranes for the removal of chromium ions from aqueous media, Polym. Bull. (2016) 73:989-1013. (Year: 2016).*
International Search Report for PCT/IB2016/055899 dated Jan. 23, 2017, 3 pages.
Written Opinion of the ISA for PCT/IB2016/055899 dated Jan. 23, 2017, 4 pages.

* cited by examiner

ASYMMETRIC COMPOSITE MEMBRANE AND A METHOD OF PREPARATION THEREOF

This application is the U.S. national phase of International Application No. PCT/IB2016/055899 filed Oct. 3, 2016 which designated the U.S., the entire contents of which are hereby incorporated by reference.

TECHNICAL FIELD

The invention relates to asymmetric composite membranes, their preparation and their use for the recovery or removal of water from feed streams. In particular, although not exclusively, the invention relates to asymmetric composite membranes for use in the removal of water from dairy feed streams.

BACKGROUND ART

Osmosis is generally seen as the movement of water from a solution of higher water chemical potential to one of lower water chemical potential. This movement, or flux, is moderated by a semi-permeable membrane, which allows the passage of water but not the passage of the species whose presence lowers the chemical potential of water in the receiving solution. This fundamental thermodynamic property of solutions is an essential component of many biological processes (McCutcheon and Wang (2012)).

The first viable semi-permeable membrane was made in the 1960s from cellulose acetate and used in reverse osmosis (Loeb (1981)). The further development of thin film composite membranes followed with the introduction of the concept of interfacial polymerisation (Mogan (1965)). In a thin film composite membrane, each individual layer can be optimised for its particular function. The thin "barrier layer" can be optimised for the desired combination of solvent flux and solute rejection, while the porous "support layer" can be optimised for maximum strength and compression resistance combined with minimum resistance to permeate flow. Numerous reviews concerning the preparation and properties of composite membranes developed for use in reverse osmosis, nano- and ultra-filtration are available (e.g. Petersen (1993)).

The desired properties of membranes used in water desalination or purification include high rejection of undesirable species, high filtration rate and good mechanical strength. Depending on the particular application in which the membrane is used other desired properties may also include resistance to fouling and chemical decomposition (McCutcheon and Wang (2013)). These latter properties are particularly desirable for membranes used in dairy processing operations where periodic cleaning and sterilisation is required.

Numerous attempts have been made to develop chlorine-tolerant, thin-film composite membranes. Thin-film composite membranes fabricated using sulfonated aromatic poly (ether sulfone) as the active layer have so far failed to satisfy flux and rejection performance requirements.

The publication of Colquhoun et al (2010) discloses a multilayer membrane with chlorine tolerance in reverse osmosis operation. The membrane consists of a film of high molecular weight poly(ether sulfone) ionomer deposited on a porous support membrane. A second layer of formaldehyde-cross-linked poly(vinyl alcohol) is deposited on the surface of the film to further increase salt rejection.

It is an object of the present invention to provide an improved asymmetric composite membrane suitable for use in the removal of water from dairy feed streams or at least to provide the public with a useful choice.

DISCLOSURE OF INVENTION

In a first aspect the invention provides an asymmetric composite membrane consisting essentially of a cross-linked poly(vinyl alcohol) polymer or polymer blend coated on a film of cross-linked sulfonated poly(ether ether ketone) adhered to a sheet of hydrophilicitized microporous polyolefin.

Preferably, the cross-linked poly(vinyl alcohol) polymer or polymer blend is cross-linked poly(vinyl alcohol) polymer or a polymer blend with poly(vinyl pyrrolidone). More preferably, the cross-linked poly(vinyl alcohol) polymer or polymer blend is cross-linked poly(vinyl alcohol).

Preferably, the cross-linking agent of the cross-linked poly(vinyl alcohol) polymer or polymer blend is selected from the group consisting of formaldehyde, glutaraldehyde and glycidyl acrylate. More preferably, the cross-linking agent of the cross-linked poly(vinyl alcohol) is glutaraldehyde.

Preferably, the cross-linking agent of the cross-linked sulfonated poly(ether ether ketone) is selected from the group consisting of: o-divinylbenzene, m-divinylbenzene, p-divinylbenzene or ethylene glycol dimethacrylate. More preferably, the cross-linking agent of the cross-linked sulfonated poly(ether ether ketone) is divinylbenzene.

Preferably, the cross-linked sulfonated poly(ether ether ketone) is hydrophilicitized and the hydrophilicitizing agent is selected from the group consisting of: 2-acrylamido-1-methyl-2-propanesulfonic acid, 2-allyoxyethanol, 4-ethenyl-benzenesulfonic acid, 2-hydroxyethyl 2-methyl-2-propenoic acid ester, 2-propenoic acid (acrylic acid) and 2-propen-1-ol. More preferably, the hydrophilitizing agent of the hydrophilicitized cross-linked sulfonated poly(ether ether ketone) is 4-ethenyl-benzenesulfonic acid, 2-allyoxyethanol or 2-hydroxyethyl 2-methyl-2-propenoic acid ester. Most preferably, the hydrophilitizing agent of the hydrophilicitized cross-linked sulfonated poly(ether ether ketone) is 2-hydroxyethyl 2-methyl-2-propenoic acid ester.

Preferably, the degree of sulfonation (DS) of the cross-linked sulfonated poly(ether ether ketone) is 40 to 70%.

Preferably, the hydrophilicitizing agent of the hydrophilicitized microporous polyolefin is selected from the group consisting of: 2-acrylamido-1-methyl-2-propanesulfonic acid, 4-ethenyl-benzenesulfonic acid, 2-hydroxyethyl 2-methyl-2-propenoic acid ester, 2-propenoic acid (acrylic acid) and 2-propen-1-ol. More preferably, the hydrophilicitizing agent of the hydrophilicitized microporous polyolefin is 2-acrylamido-2-methylpropane sulfonic acid (AMPS) or 4-ethenyl-benzenesulfonic acid.

Preferably, the polyolefin of the hydrophilicitized microporous polyolefin is poly(ethylene).

In a second aspect the invention provides a method of preparing an asymmetric composite membrane of the first aspect of the invention comprising the steps:

1. Adhering a film of cross-linked sulfonated poly(ether ether ketone) to a sheet of hydrophilicitized microporous poly(ethylene) to provide a composite substrate;
2. Coating the cross-linked sulfonated poly(ether ether ketone) of the composite substrate with a solution comprising poly(vinyl alcohol) and a cross-linking agent in a solvent to provide a first coated composite substrate; and then 3. Irradiating the first coated composite substrate for a time and at a wavelength sufficient to provide a first coating of cross-linked poly(vinyl alcohol) on the composite substrate.

Preferably, the method comprises the additional subsequent steps of:

4. Coating the first coating of cross-linked poly(vinyl alcohol) with a solution comprising poly(vinyl alcohol) and a cross-linking agent in a solvent to provide a second coated composite substrate; and then
5. Irradiating the second coated composite substrate for a time and at a wavelength sufficient to provide a second coating of cross-linked poly(vinyl alcohol) on the composite substrate.

Preferably, the wavelength is between 280 and 400 nm. More preferably, the wavelength is between 350 and 370 nm.

Preferably, the cross-linking is glutaraldehyde.

In the description and claims of this specification the following acronyms, terms and phrases have the meaning provided: "comprising" means "including", "containing" or "characterized by" and does not exclude any additional element, ingredient or step; "consisting of" means excluding any element, ingredient or step not specified except for impurities and other incidentals; "consisting essentially of" means excluding any element, ingredient or step that is a material limitation; "crosslinking agents" means materials that are incorporated into the crosslinking bridge of a cross-linked polymer network; "degree of sulfonation" means the ratio of moles of sulfonated structural repeating units to total moles of structural repeating units expressed as a percentage; "DS" means degree of sulfonation; "flow" means the rate at which a feed stream is introduced; "flux" means the rate (volume per unit of time) of permeate transported per unit of membrane area; "graft polymer" means a polymer in which the linear main chain has attached to it at various points side chains of a structure different from the main chain; "homopolymer" means a polymer formed by the polymerization of a single monomer; "hydrophilic" means having a tendency to mix with, dissolve in, or be wetted by water and "hydrophilicity", "hydrophilicitized" and "hydrophilicitizing" have corresponding meanings; "hydrophilicitizing agents" means reagents that are incorporated as monomers, oligomers or polymers into a graft polymer network to impart hydrophilic properties; "hydrophobic" means having a tendency to repel or fail to mix with water and "hydrophobicity" has a corresponding meaning; "ionomer" means a polymer that comprises both electrically neutral structurally repeating units and a fraction of ionized structurally repeating units; "microporous" means consisting of an essentially continuous matrix structure containing substantially uniform small pores or channels throughout the body of the substrate (such as may be manufactured using a cast (wet) process technology) and specifically excludes a discontinuous matrix of woven or non-woven fibres; "permeate" means the aqueous solution or purified water transported; "photoinitiator" means a photolabile compound which upon irradiation forms a radical; "polymer blend" means a homogenous or heterogeneous physical mixture of two or more polymers; "post-treated polymer" means a polymer that is modified, either partially or completely, after the basic polymer backbone has been formed; "preformed" means formed beforehand, i.e. prior to treatment; "recovery" means the percentage of the feed stream that emerges from the system as product water or permeate; "rejection" means the percentage of solute concentration removed from the feed stream by the membrane; "structural repeating unit" means a smallest structural unit that repeats in the polymer backbone; "UVA" means electromagnetic radiation having wavelengths between 320 and 400 nm and "UVB" means electromagnetic radiation having wavelengths between 290 and 320 nm.

The terms "first", "second", "third", etc. used with reference to elements, features or integers of the subject matter defined in the Statement of Invention and Claims, or when used with reference to alternative embodiments of the invention are not intended to imply an order of preference. The terms "film" and "sheet" are used to distinguish between planar materials of differing thickness, i.e. where a film is thinner than a sheet.

Distinguishable material limitations are not to be inferred from the use of the terms "coating" and "film" or "adhered" and "coated". Without additional qualification the terms "adhered" and "coated" are used synonymously. To facilitate understanding the terms "film" and "adhered" are generally used with reference to crosslinked, sulfonated poly(ether ether ketone) and the terms "coating" and "coated" are generally used with reference to crosslinked poly(vinyl alcohol).

Where concentrations or ratios of ingredients, reagents or substrates are specified the concentration or ratio specified is the initial concentration or ratio of the ingredients, reagents or substrates. Where values are expressed to one or more decimal places standard rounding applies. For example, 1.7 encompasses the range 1.650 recurring to 1.749 recurring. Where the hydrophilicitizing agent of the hydrophilicitized microporous polyolefin is 4-ethenyl-benzensulfonic acid (SSS) the hydrophilicitized microporous polyolefin may also be referred to as sulfonated microporous polyolefin.

In the absence of further limitation, the use of plain bonds in the representations of the structures of compounds encompasses the diastereomers, enantiomers and mixtures thereof of the compounds.

The invention will now be described with reference to embodiments or examples and the figures of the accompanying drawings pages.

DETAILED DESCRIPTION

The specification accompanying international application no. PCT/NZ2015/050034 describes the preparation of an asymmetric composite membrane consisting of a film of cross-linked sulfonated poly(ether ether ketone) adhered to a sheet of sulfonated microporous poly(ethylene). The preparation of batches of the membrane is described using preformed sheets of microporous poly(ethylene) sulfonated by reaction with a phosphorus pentoxide-sulfuric acid "sulfonating agent".

The specification accompanying international application no. PCT/IB2016/103239 also describes the preparation of an asymmetric composite membrane consisting of a film of cross-linked sulfonated poly(ether ether ketone) adhered to a sheet of sulfonated microporous poly(ethylene). The preparation by a method adaptable to the continuous production of the membrane is described. The method using UV-initiated grafting of the preformed sheets with a hydrophilicitizing agent to provide the sulfonated microporous poly(ethylene). The method also uses UV-initiated cross-linking to provide the cross-linked sulfonated poly(ether ether ketone). A number of hydrophilicitizing and cross-linking agents for use in these contexts are identified.

Although the publication of He et al (2008) discloses a membrane comprising sulfonated poly(ether ether ketone) (SPEEK), this publication does not suggest the use of a microporous poly(ethylene) as a support layer. In the asymmetric composite membrane described here hydrophilicitization (by sulfonation) of the microporous poly(ethylene) support layer is used to promote adherence between the film of sulfonated poly(ether ether ketone) and the sheet of poly(ethylene). The description provided in the now published specifications (publ. nos. WO 2015/147657 and WO 2016/103239) are incorporated by reference.

In the asymmetric composite membranes described in the publications of Briggs et al (2015) and Exley (2016) the film of cross-linked poly(ether ether ketone) is acting as the rejection layer of the membrane and the primary determinant of the selectivity of the membrane with regard to the rejection of different solute species. It has now been found that the selectivity of these asymmetric composite membranes can be further improved by adhering a coat of cross-linked poly(vinyl alcohol) to the surface of the film of cross-linked poly(ether ether ketone). The coating may be applied in a single or in multiple steps. The improvement in the performance of the membrane with regard to its selectivity is achieved without significant loss of the favourable characteristic of durability during repeated clean-in-place (CIP) protocols observed for the asymmetric composite membranes described in the publications of Briggs et al (2015) and Exley (2016). In the following description the phrase "composite substrate" is used to refer to a composite consisting of a film of cross-linked sulfonated poly(ether ether ketone) adhered to a sheet of sulfonated microporous poly(ethylene).

Poly(vinyl alcohol) (PVA) is a hydrophilic polymer that swells in water. In the method of preparing an asymmetric composite membrane described in this specification the swelling (and potential delamination from the underlying film of crosslinked sulfonated poly(ether ether ketone)) is controlled by cross-linking the PVA using the cross-linking agent glutaraldehyde. It is anticipated that other cross-linking agents may be employed, but to date glutaraldehyde has been found to be the most suitable for cross-linking of PVA in the preparation of the asymmetric composite membranes described here.

Figure 1:
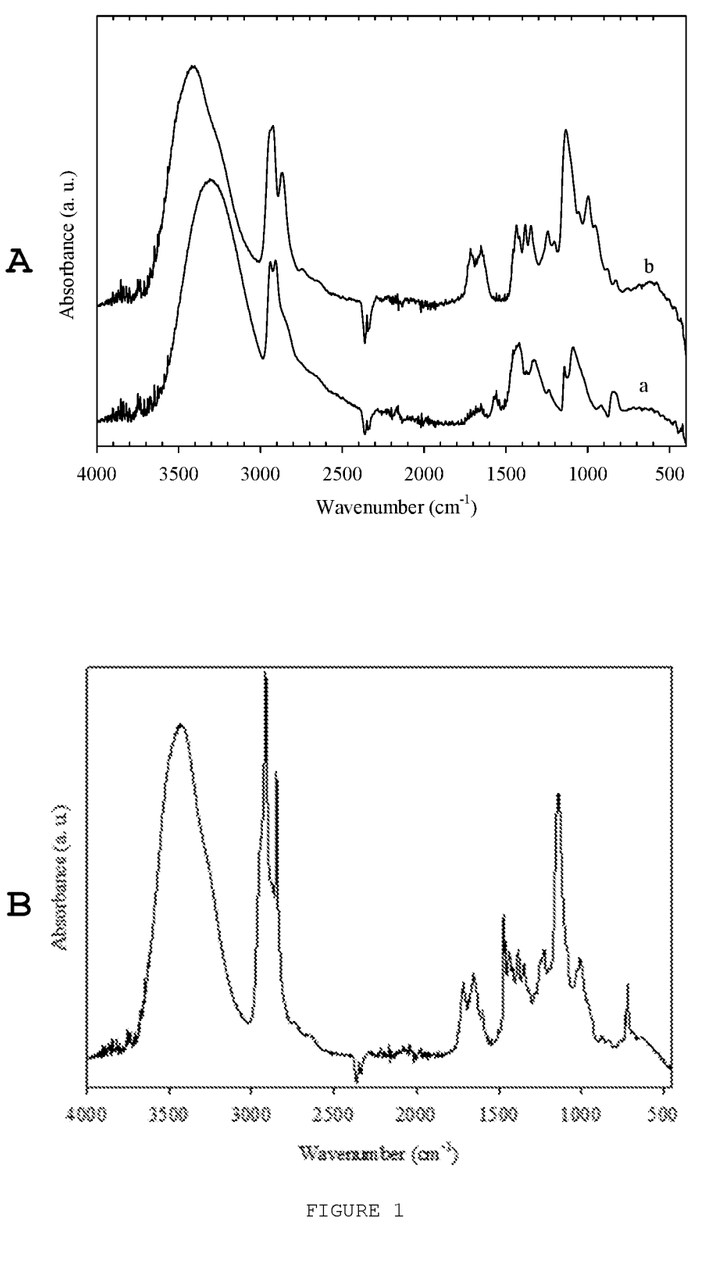
FIG. 1A. FTIR spectra of poly(vinyl alcohol)(PVA) before (a; lower trace) and after (b; upper trace) crosslinking with glutaraldehyde (GA). Spectra were recorded using a Thermo Electron Nicolet 8700 Fourier transform infrared spectrometer equipped with a single bounce ATR and diamond crystal. An average of 32 scans with a 4 cm$^{-1}$ resolution were recorded for each sample.
FIG. 1B. FTIR spectra of a sample of asymmetric composite membrane after four clean-in-place (CIP) protocols. Spectra were recorded using a Thermo Electron Nicolet 8700 Fourier transform infrared spectrometer equipped with a single bounce ATR and diamond crystal. An average of 32 scans with a 4 cm' resolution were recorded for each sample.

The Fourier transform infrared (FTIR) spectra obtained for PVA powder (FIG. 1A) and samples of the asymmetric composite membrane were consistent with cross-linking via acetalization. Notably not all available hydroxyl (—OH) groups of the PVA are consumed in the cross-linking process. This ensures the coating of cross-linked PVA retains a hydrophilic character. The FTIR spectra obtained for samples of membrane following repeated CIP protocols were consistent with stable cross-links being formed (FIG. 1B). The combination of a cross-linked poly(vinyl alcohol) coating on a film of poly(ether ether ketone) adhered to a sheet of hydrophilic microporous polyethylene provides a durable asymmetric composite membrane suitable for use in commercial processing operations with improved selectivity. Several methods of preparing the asymmetric composite membranes willow be described.

Method I

Preparation of Sulfonated Poly(Ether Ether Ketone)

An amount of poly(ether ether ketone) (PEEK) (VICTR-EXTh 450 P, Victrex Manufacturing Limited, England) was sulfonated by heating to 70° C. in concentrated sulfuric acid (95%) for 8 h. The sulfonated PEEK (sPEEK) was then precipitated and washed in ice water several times before being dried in a vacuum oven. The degree of sulfonation of the sPEEK was determined by titration according to a modified form of the method disclosed in the publication of Drioli et al (2004). The sPEEK was leached for three days in a 3M solution of sodium chloride (NaCl) and the resulting solution titrated against a 0.2 M solution of sodium hydroxide (NaOH) using phenolphthalein as indicator.

Preparation of a Film of Semi-Cured Cross-Linked sPEEK

An amount of sPEEK (0.2 g) with a 69% degree of sulfonation (DS) was added to a volume of dimethylacetamide (DMAc) (2.7 mL) and sonicated until a clear to slightly cloudy dispersion was obtained. A volume (0.1 mL) of the crosslinking agent divinylbenzene (DVB) and an amount (0.14 g) of the hydrophilicitizing agent 2-hydroxyethyl 2-methyl-2-propenoic acid ester (HEMA) were added to the dispersion of sPEEK in DMAc to provide a mixture containing 8% (w/w) sPEEK (0.216 mol/L) and molar ratios of DVB to sPEEK of and HEMA to sPEEK of 1:2. An amount of the photoinitiator benzophenone (8 μg) was added to the mixture before pouring onto a glass plate and exposing to 0.1 mW m$^{-1}$ UVA fluorescent lamps (368 nm) at a distance of 50 mm for a limited time of 90 s to provide the semi-cured film of cross-linked sPEEK.

Preparation of Sheet of Hydrophilicitized Microporous Poly(Ethylene)

A preformed sheet (20 μm thickness) of microporous (45% porosity, 0.08 μm average pore diameter) poly(ethylene) (PE) (CELGARD™ K2045, Celgard LLC) was wetted with a solution in 1:1 (v/v) acetone-water of 1% (w/v) benzophenone and 6% (w/v) 2-hydroxyethyl 2-methyl-2-propenoic acid ester (HEMA). The solution was prepared by mixing benzophenone with acetone before adding water and then HEMA. The wetted sheet was then UVA-irradiated at a peak wavelength of 368 nm for a maximum of 5 min before washing in an excess of water using ultrasound and soaking to provide the hydrophilicitized sheet of microporous PE.

Preparation of Composite Substrate

The hydrophilicitized sheet of microporous PE was laid on top of the semi-cured film of semi-cured cross-linked sPEEK and exposed to 0.1 mW m$^{-1}$ UVA fluorescent lamps (368 nm) at a distance of 50 mm for a limited time of 210 s. The UVA-irradiated composite substrate was then dried in an oven at 60° C. for 30 min to promote adherence of the film and sheet before releasing the composite substrate from the glass plate by immersing in a water bath at room temperature for 10 to 15 min and rinsing with a large excess of deionised (DI) water at 50° C. to provide the composite substrate.

Preparation of the Asymmetric Composite Membrane—Example 1

The composite substrate was placed on a glass plate with the film of cross-linked sPEEK uppermost and coated with a solution in water of 5% (w/w) poly(vinyl alcohol) (PVA). The coated composite substrate was then dried at 65° C. for 10 to 15 min. The coated composite substrate was then recoated with an ice cooled mixture in acidified (H$_2$SO$_4$) water of 5% (w/w) PVA and 2.5% (w/w) of the crosslinking agent glutaraldehyde (GA) and further cured at 65° C. for 15 min to provide the asymmetric composite membrane. The membrane was washed with tap water and lifted from the glass plate before assessment.

Preparation of the Asymmetric Composite Membrane—Example 2

The composite substrate was placed on a glass plate with the film of cross-linked sPEEK uppermost and coated with a solution in 7:3 (v/v) water-isopropanol of 0.5% (w/w) PVA. The coated composite substrate was then dried at 65° C. for 10 to 15 min. The coated composite substrate was then recoated with an ice cooled mixture in acidified (H$_2$SO$_4$) water of 2% (w/w) poly(vinyl pyrrolidone) (PVP), 2% (w/w) PVA and 2.5% (w/w) of the crosslinking agent glutaraldehyde (GA) and further cured at 65° C. for 15 min to provide the asymmetric composite membrane. The membrane was washed with tap water and lifted from the glass plate before assessment.

Preparation of the Asymmetric Composite Membrane—Example 3

The composite substrate was placed on a glass plate with the film of cross-linked sPEEK uppermost and coated with a cooled mixture in acidified (H$_2$SO$_4$) water of 1% (w/w) PVA and 2.5% (w/w) of the crosslinking agent glutaraldehyde (GA). The coated composite substrate was then dried at 65° C. for 10 to 15 min. The coated composite substrate was then recoated with the cooled mixture and further cured at 65° C. for 15 min to provide the asymmetric composite membrane. The membrane was washed with tap water and lifted from the glass plate before assessment.

Method II

Preparation of Sulfonated Poly(Ether Ether Ketone)

An amount of poly(ether ether ketone) (PEEK) (VICTREXTh 150 P, Victrex Manufacturing Limited, England) was sulfonated by heating to 70° C. in concentrated sulfuric acid (98%) for 4 h. The sulfonated PEEK (sPEEK) was then precipitated and washed in ice water several times before being dried in a vacuum oven overnight. The degree of sulfonation of the sPEEK was determined by titration according to a modified form of the method disclosed in the publication of Drioli et al (2004). The sPEEK was leached for three days in a 3M solution of sodium chloride (NaCl) and the resulting solution titrated against a 0.2 M solution of sodium hydroxide (NaOH) using phenolphthalein as indicator.

Preparation of a Composite Substrate

The polyethylene (PE) is first cut, using a craft knife, into rectangles measuring 185 mm×135 mm. The corners are removed to allow for it to fit within the testing rig. The initial weights of the cut PE are taken.

Backing layer solution is prepared using an amount of 0.6 g of 4-ethenyl-benzenesulfonic acid (SSS) and an amount of 0.1 g of benzophenone (BP). The measured amounts of SSS and BP are transferred to a vial and a volume of 5 mL of DI and a volume of 5 mL of acetone are added. The vial is sealed and shaken/stirred until the materials have completely dissolved.

Rejection layer solution is prepared using an amount of sPEEK (0.24 g) with a degree of sulfonation (DS) in the range of 50-70%. An amount of sPEEK is added to a volume of 5 mL methanol (MeOH) and sonicated until a clear to slightly cloudy dispersion was obtained. An amount of the crosslinking agent divinylbenzene (DVB) and a volume of 2 mL the hydrophilicitizing agent 2-hydroxyethyl 2-methyl-2-propenoic acid ester (HEMA) are added to the dispersion of sPEEK in MeoH.

Rejection layer solution is applied to aluminium foil and left to flash off for 10 min. The rejection layer is then cured under fluorescent lamps for 12 min. A sheet of microporous PE film is wet-out with the backing layer solution. The wet-out PE film is then laid on top of the cured rejection layer. The composite substrate is then cured together under fluorescent lamps for 3.5 min. The cured composite is washed under tap water for 10 s.

The composite substrate is dried in an oven at 65° C. for 30 min and then lifted from the aluminium foil by immersion in a solution of 2% w/w sodium hydroxide (NaOH).

Preparation of the Asymmetric Composite Membrane—Example 4

The composite substrate was placed on a glass plate with the film of cross-linked sPEEK uppermost and coated with a solution in water of 5% (w/w) poly(vinyl alcohol) (PVA). The coated composite substrate was then dried at 65° C. for 10 to 15 min. The coated composite substrate was then recoated with an ice cooled mixture in acidified (H$_2$SO$_4$) water of 5% (w/w) PVA and 2.5% (w/w) of the crosslinking agent glutaraldehyde (GA) and further cured at 65° C. for 15 min to provide the asymmetric composite membrane. The membrane was washed with tap water and lifted from the glass plate before assessment.

Preparation of the Asymmetric Composite Membrane—Example 5

The composite substrate was placed on a glass plate with the film of cross-linked sPEEK uppermost and coated with a solution in 7:3 (v/v) water-isopropanol of 0.5% (w/w) PVA. The coated composite substrate was then dried at 65° C. for 10 to 15 min. The coated composite substrate was then recoated with an ice cooled mixture in acidified ($H_2SO_4$) water of 2% (w/w) poly(vinyl pyrrolidone) (PVP), 2% (w/w) PVA and 2.5% (w/w) of the crosslinking agent glutaraldehyde (GA) and further cured at 65° C. for 15 min to provide the asymmetric composite membrane. The membrane was washed with tap water and lifted from the glass plate before assessment.

Preparation of the Asymmetric Composite Membrane—Example 6

The composite substrate was placed on a glass plate with the film of cross-linked sPEEK uppermost and coated with a cooled mixture in acidified ($H_2SO_4$) water of 1% (w/w) PVA and 2.5% (w/w) of the crosslinking agent glutaraldehyde (GA). The coated composite substrate was then dried at 65° C. for 10 to 15 min. The coated composite substrate was then recoated with the cooled mixture and further cured at 65° C. for 15 min to provide the asymmetric composite membrane. The membrane was washed with tap water and lifted from the glass plate before assessment.

Method III

Preparation of Sulfonated Poly(Ether Ether Ketone) [Sample 171214-17.5]

Sample 171214-17.5 was made using 450P PEEK at a concentration of 5% w/v PEEK to sulphuric acid ($H_2SO_4$). The PEEK is stirred at room temperature for 17.5 h before dropping out in an ice bath and washing until pH~6.5. The material is dried at 65° C. in vacuum oven overnight. The dried product is soluble in DMAc but not in MeOH nor MeOH/water.

Preparation of a Composite Substrate

This procedure requires a pre-cured, modified PE backing layer to be placed on a semi-cured rejection layer. The modification of the backing layer will be described first.

Backing layer preparation: The PE is first cut, using a craft knife, into rectangles measuring 185 mm×135 mm. The corners are removed to allow for it to fit within the testing rig. The initial weights of the cut PE are taken.

A volume of 1.2 mL of 2-acrylamido-2-methylpropane sulfonic acid (AMPS) and an amount of 0.1 g Benzophenone (BP) are weighed out. Then, AMPS and BP are transferred to a vial and a volume of 5 mL of DI and a volume of 5 mL of acetone are added are added. The vial is sealed and shaken/stirred until the materials have completely dissolved. Once the solution is made contact with light should be minimised due to the photoreactivity of the BP.

A PE sheet is placed onto a glass plate within a fume hood and a small amount (~3-5 mL) is placed on the top of the sheet. It will be observed that the sheet will appear semi-transparent upon contact with the solution. The solution is quickly spread over the sheet to form a uniform coating using either a finger or a threaded rod. Due to evaporation of the solvent dry patches may appear after application. If this occurs more solution should be applied so that the entire sheet is semi-transparent. Once the solution has been evenly applied the glass plate, with the wetted PE sheet, is placed inside a sealable PE bag. It should be noted that the plate should be placed in the bag and sealed rapidly after even application of the solution is achieved due to risk of solvent evaporation in an open environment. The PE bag is then placed into a UVA light source with a wavelength >350 nm at a distance of ~50 mm for 90 s to cure.

After curing the plate and membrane are left in the bag while the rejection layer is semi cured, this prevents the membrane from drying, allowing for a flat, even application of the backing layer to the rejection layer.

Rejection layer solution is prepared using an amount of sPEEK (0.23 g), an amount of 0.1125 g of DVB, an amount of 0.158 g of SSS and an amount of 0.0204 g of BP. These materials are transferred to a vial and a volume of 2 mL of DMAc was added. The vial is sealed and shaken/stirred until the materials have completely dissolved. Once the solution is made contact with light should be minimised due to the photoreactivity of the BP.

A small amount of solution, ~0.6 mL, is placed on the smooth aluminium foil surface and spread evenly over an area slightly larger than that of the membrane. The plate with the solution is then cured with a UVA light source with a wavelength >350 nm at a distance of ~50 mm for 45 s to cure the rejection layer.

While curing the modified backing layer is removed from the bag/plate. The backing layer is then laid flat on to the cured rejection layer, ensuring no wrinkles or bubbles in the backing layer. The plate with the backing layer and rejection layer is then placed in to a drying oven for 30 min at 65° C.

Once dried the membrane may be stuck to the aluminium foil. The membranes can be separated from the foil by soaking in 1-2% NaOH. After the membrane is removed from the foil the sheets are rinsed in DI and extracted in DI at 50° C. for 3 h. The extracted membranes are dried and stored for testing.

Preparation of the Asymmetric Composite Membrane

The procedures for the preparation of Example 4 (slightly modified as shown below) and Example 6 are used.

Preparation of the Asymmetric Composite Membrane—Example 7

The composite substrate was placed on a glass plate with the film of cross-linked sPEEK uppermost and coated with a solution in water of 5% (w/w) poly(vinyl alcohol) (PVA). The coated composite substrate was then dried at 65° C. for 10 to 15 min. The coated composite substrate was then recoated with an ice cooled mixture in acidified ($H_2SO_4$) water of 1% (w/w) PVA and 2.5% (w/w) of the crosslinking agent glutaraldehyde (GA) and further cured at 65° C. for 15 min to provide the asymmetric composite membrane. The membrane was washed with tap water and lifted from the glass plate before assessment.

Preparation of the Asymmetric Composite Membrane—Example 8

A volume of 0.25 mL of 98% $H_2SO_4$ was added to 10 mL of 1% (w/w) PVA in water. The vial was cooled in an ice bath before the addition of 0.25 mL of GA.

The composite substrate was placed on a glass plate with the film of crosslinked sPEEK uppermost and coated with the PVA solution. The coated composite substrate was then dried at 65° C. for 10-15 min. The coated composite substrate was then recoated with the cooled PVA solution and further cured at 65° C. for 10-15 min to provide the PVA asymmetric composite membrane. The membrane was washed with tap water, lifted from the glass plate and dried at room temperature before assessment.

Method IV

This procedure uses a pre-cured, modified PE backing layer placed on a semi-cured rejection layer.

Preparation of Sulfonated Poly(Ether Ether Ketone) [Sample 24/11]

An amount of 15 g (PEEK) (VICTREXTh 150 P, Victrex Manufacturing Limited, England) was sulfonated by heating to 70° C. in concentrated sulfuric acid (98%). The PEEK is stirred at room temperature for 17.5 h before dropping out in an ice bath and washing until pH ~6.5. The material is dried at 65° C. in vacuum oven overnight.

Preparation of a Composite Substrate

The polyethylene (PE) is first cut, using a craft knife, into rectangles measuring 185 mm×135 mm. The corners are removed to allow for it to fit within the testing rig. The initial weights of the cut PE are taken.

Backing layer solution is prepared using an amount of 0.6 g of 4-ethenyl-benzenesulfonic acid (SSS) and an amount of 0.1 g of benzophenone (BP). The measured amounts of SSS and BP are transferred to a vial and a volume of 5 mL of DI and a volume of 5 mL of acetone are added. The vial is sealed and shaken/stirred until the materials have completely dissolved. Once the solution is made contact with light should be minimised due to the photoreactivity of the BP.

A PE sheet is placed onto a glass plate within a fume hood and a small amount (~3-5 mL) is placed on the top of the sheet. It will be observed that the sheet will appear semi-transparent upon contact with the solution. The solution is quickly spread over the sheet to form a uniform coating using either a finger or a threaded rod. Due to evaporation of the solvent dry patches may appear after application. If this occurs more solution should be applied so that the entire sheet is semi-transparent. Once the solution has been evenly applied the glass plate, with the wetted PE sheet, is placed inside a sealable PE bag. It should be noted that the plate should be placed in the bag and sealed rapidly after even application of the solution is achieved due to risk of solvent evaporation in an open environment. The PE bag is then placed into a UVA light source with a wavelength >350 nm at a distance of ~50 mm for 210 s to cure. After curing the plate is removed from the bag and the modified PE sheet is then rinsed, while on the plate, in warm water for 10 s. The plate is then placed into a drying oven for 30 min at 65° C. One dry the plates are removed from the oven and allowed to cool to room temperature.

After drying the PE sheet is then placed into 50° C. DI for 3 h to allow extraction of non-crosslinked/grafted materials within the sheet. The sheets are left in the DI but allowed to cool to room temperature.

The glass plates are wrapped in tinfoil, ensuring one side has a smooth flat surface. Rejection layer solution is prepared using an amount of sPEEK (0.3 g), an amount of 0.111 g of DVB, an amount of 0.2127 g of allyl oxy-ethanol (AOE) and an amount of 0.017 g of BP. These materials are transferred to a vial and a volume of 4 mL of DMAc was added. The vial is sealed and shaken/stirred until the materials have completely dissolved. Once the solution is made contact with light should be minimised due to the photoreactivity of the BP.

A small amount of solution, ~0.5 mL, is placed on the smooth aluminium foil surface and spread evenly over an area slightly larger than that of the membrane. The plate with the solution is then cured with a UVA light source with a wavelength >350 nm at a distance of ~20 mm for 90 s to cure the rejection layer. While curing the modified backing layer is removed from the DI and the excess water is removed, while leaving the membrane wetted.

The backing layer is then laid flat on to the cured rejection layer, ensuring no wrinkles or bubbles in the backing layer. The plate with the backing layer and rejection layer is then placed in to a drying oven for 30 min at 65° C.

Once dried the membrane may be stuck to the aluminium foil. The membranes can be separated from the foil by soaking in 1-2% NaOH. Once removed from the foil the sheets are rinsed in fresh DI and stored either dry or in a PE bag with DI.

Preparation of the Asymmetric Composite Membrane—Example 9

The procedure for the preparation of Example 6 is used. A volume of 0.25 mL of 98% $H_2SO_4$ was added to 10 mL of 1% (w/w) PVA in water. The vial was cooled in an ice bath before the addition of 0.25 mL of GA. The composite substrate was placed on a glass plate with the film of crosslinked sPEEK uppermost and coated with the PVA solution. The coated composite substrate was then dried at 65° C. for 10-15 min. The coated composite substrate was then recoated with the cooled PVA solution and further cured at 65° C. for 10-15 min to provide the PVA asymmetric composite membrane. The membrane was washed with tap water, lifted from the glass plate and dried at room temperature before assessment.

Assessment of Asymmetric Composite Membranes

The performance of samples of asymmetric composite membrane selected from Examples 1 to 9 was assessed.

Salt and Sucrose Rejection

Figure 2:
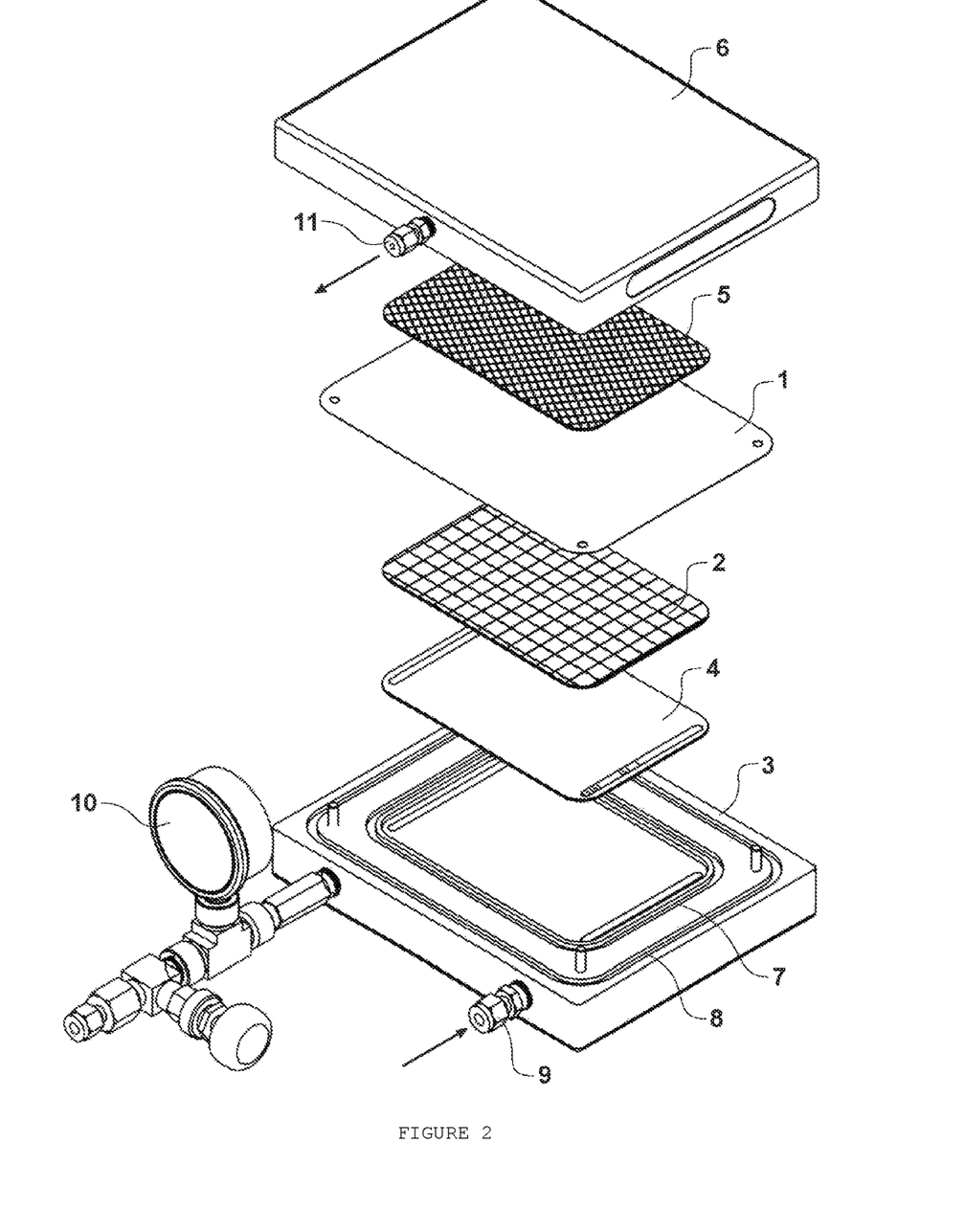
FIG. 2. Exploded view of the filter assembly (Sterlitech Corp.) used in the flux testing of the examples of the asymmetric composite membrane.

The performance of the asymmetric composite membrane was evaluated using a flux test unit of the type illustrated in FIG. 2 (Sterlitech Corporation, 22027 70th Avenue S, Kent, Wash. 98032-1911 USA). The sample of the asymmetric composite membrane (1) was pre-wetted by dipping in distilled water and then placed on a coarse support mesh (2) located in the lower half (3) of the flux test unit housing with a shim (4) optionally interposed. The sample was placed with the PVA coated side of the asymmetric composite membrane facing downwards. A fine mesh (5) located in the upper half of the filter assembly (6) housing was placed over the upper surface of the sample of the asymmetric composite membrane (1). The filter assembly was sealed by sealing rings (7, 8) and held in a hydraulic press pressurised to 60 Bar. The inlet port (9) of the lower half of the filter assembly housing (3) was in fluid connection with a feed reservoir (not shown) from which a feed stream was pumped at a rate to maintain the feed stream pressure measured on the pressure gauge (10). Permeate was collected from the outlet port (11) of the upper half of the filter assembly housing (6) in a graduated cylinder (not shown). Feed streams consisting of solutions in water of (i) 2000 ppm sodium chloride (NaCl) and 2000 ppm sucrose or (ii) 2000 ppm magnesium sulfate ($MgSO_4$) were passed through the asymmetric composite membrane under pressure at a temperature of about 18° C. The permeate flux and rejection of salts and sucrose at a predetermined highest pressure (usually 20 Bar) were measured once the system had reached steady (typically after 1 h).

The permeate flux (J), i.e. the volume (V) of permeate passing through a sample of asymmetric composite membrane of area (A) during a period of time (t) was calculated according to the following equation:

$$J = \frac{V}{A.t}$$

Conductivities of the feed stream (Fσ) and permeate (Pσ) were measured using a multi parameter meter (Oakton PCS Tester 35, Cole-Parmer, New Zealand) at ambient temperature. Salt rejection (R) was calculated according to the following equation:

$$R = \left(1 - \frac{P\sigma}{F\sigma}\right) \times 100$$

Sucrose rejection was calculated based on the dry weights of residues obtained after evaporating the solvent from known volumes of feed and permeate samples.

In Situ Cleaning of Asymmetric Composite Membrane

To mimic commercial processing operations the asymmetric composite membrane was subjected to the 'clean-in-place' (CIP) protocols summarised in Tables 1 and 2. The salt and sucrose rejections were determined following repeated CIP protocols.

TABLE 1

Clean-in-place (CIP) protocol employed for the assessment of samples of asymmetric composite membrane (Examples 1 to 6).

| Step | Wash | pH | Time (min) | Temperature (° C.) |
|---|---|---|---|---|
| 1 | Water | 6-7 | 5 | 35 |
| 2 | Water | 6-7 | 5 | 35 |
| 3 | Alkali (2% (w/w) NaOH) | 12 | 10 | 35 |
| 4 | Water | 6-7 | 5 | 35 |
| 5 | Acid (2% (w/w) H$_2$NO$_3$) | 1.5 | 10 | 35 |
| 6 | Water | 6-7 | 5 | 35 |
| 7 | 1,000 ppm sodium hypochlorite | pH > 10 | 10 | 35 |
| 8 | Water | 6-7 | 5 | 35 |
| 9 | Water | 6-7 | 1-2 | 35 |
| 10 | Water | 6-7 | 1-2 | Ambient |

Example 4

Figure 3:
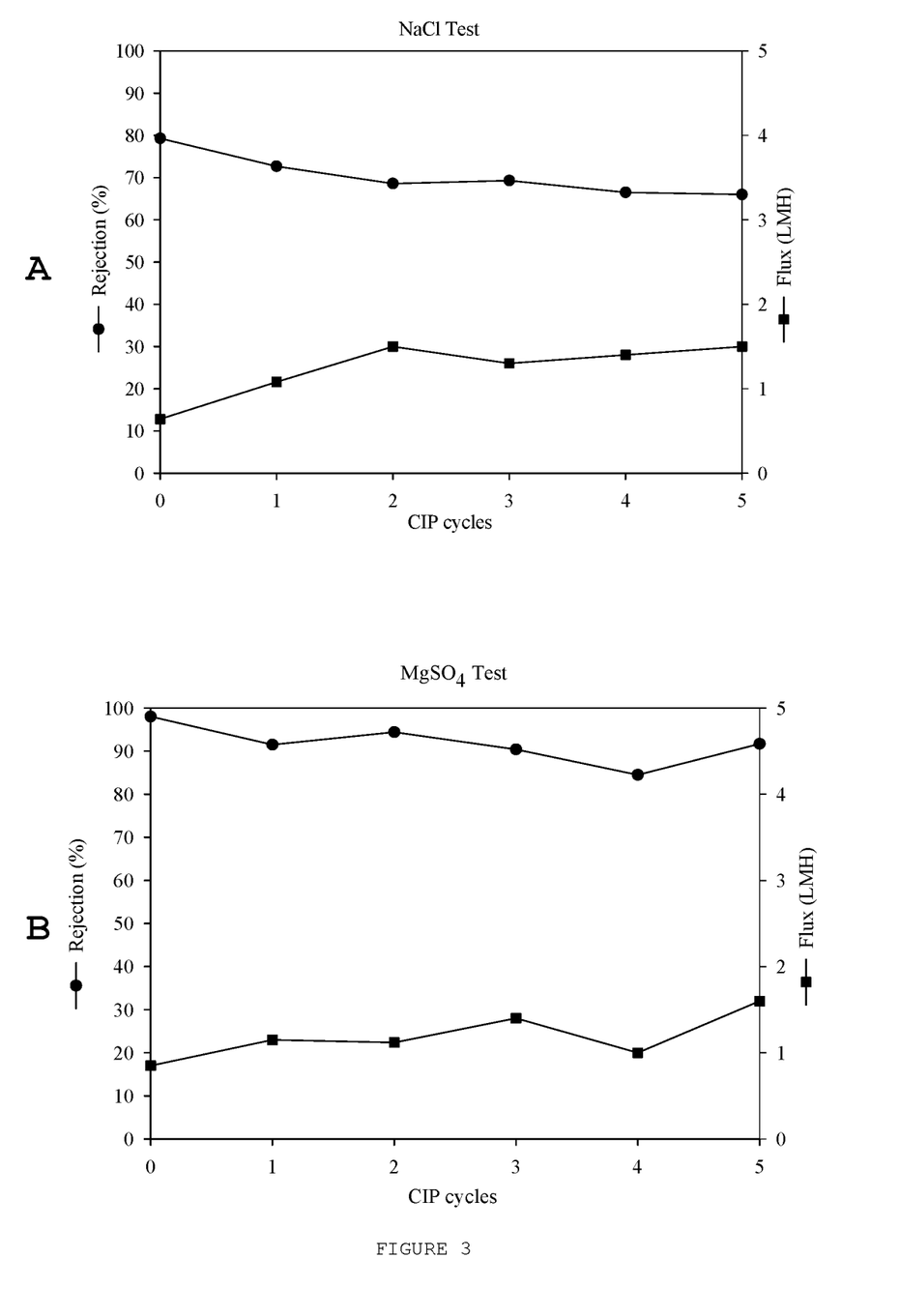
FIG. 3. Flux rates (■) and rejections (●) of (A) sodium chloride (NaCl) and (B) magnesium sulfate (MgSO$_4$) for a sample of the asymmetric composite membrane (Example 4) following repeated clean-in-place (CIP) protocols.
Figure 4:
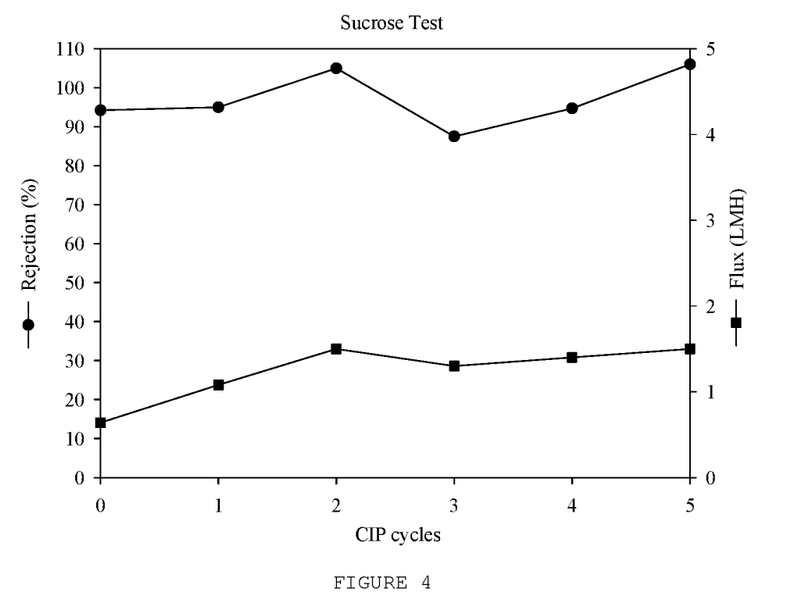
FIG. 4. Flux rate (■) and rejection of sucrose (●) for a sample of the asymmetric composite membrane (Example 4) following repeated clean-in-place (CIP) protocols.
Figure 5:
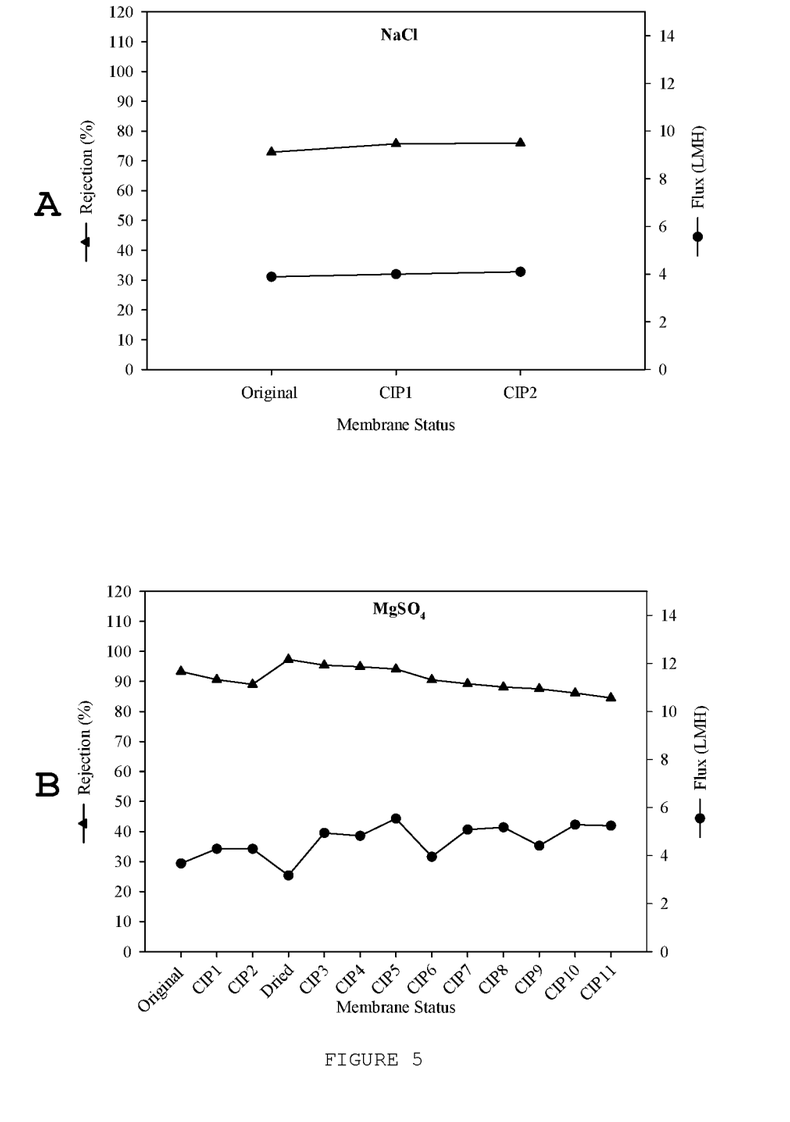
FIG. 5. Flux rates (●) and rejections (▲) of (A) sodium chloride (NaCl) and (B) magnesium sulfate (MgSO$_4$) for a sample of the asymmetric composite membrane (Example 5) following repeated clean-in-place (CIP) protocols.

This sample of the asymmetric composite membrane exhibited initial rejections of 79.3% NaCl (at a flux of 0.64 LMH), 98% MgSO$_4$ (at a flux of 0.85 LMH) and 94.2% sucrose. A series of CIP protocols were conducted to test the stability of the rejection layer of the sample. After the fourth CIP protocol stabilized rejections of 66.5% NaCl and 94.7% sucrose were obtained. A rejection of 84.5% MgSO$_4$ was obtained, but then jumped to 91.7% after the fifth CIP. The stabilized performances indicate the membrane had survived the harsh CIP conditions. The performance of the membrane after each CIP cycle is provided in FIGS. 3 and 4.

Example 5

Figure 6:
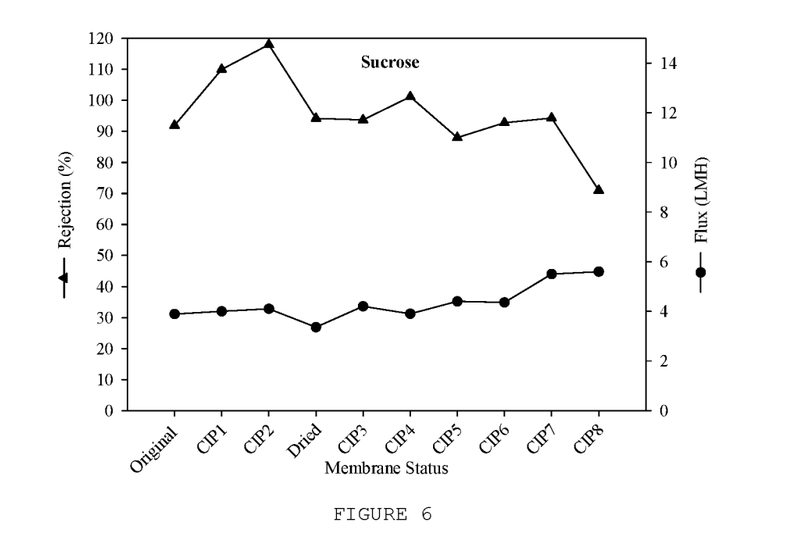
FIG. 6. Flux rate (●) and rejection of sucrose (▲) for a sample of the asymmetric composite membrane (Example 5) following repeated clean-in-place (CIP) protocols.
Figure 7:
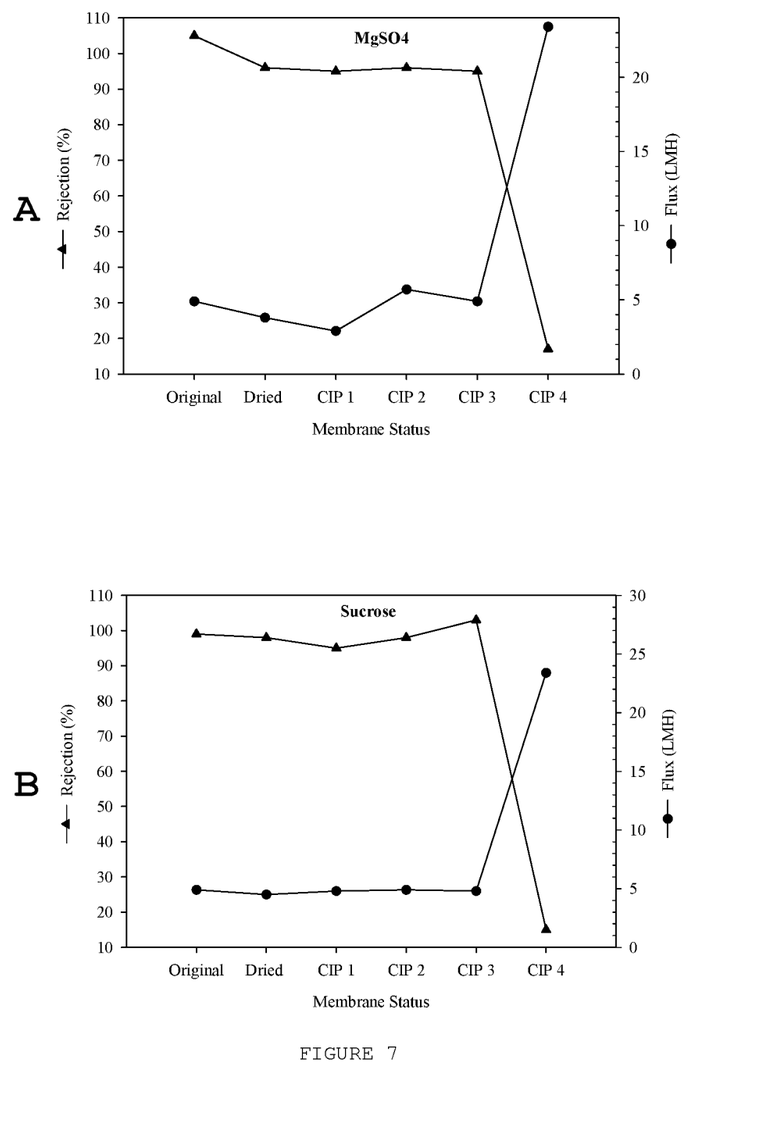
FIG. 7. Flux rates (●) and rejections (▲) of (A) magnesium sulfate ($MgSO_4$) and (B) sucrose for a sample of the asymmetric composite membrane (Example 6) following repeated clean-in-place (CIP) protocols.
Figure 8:
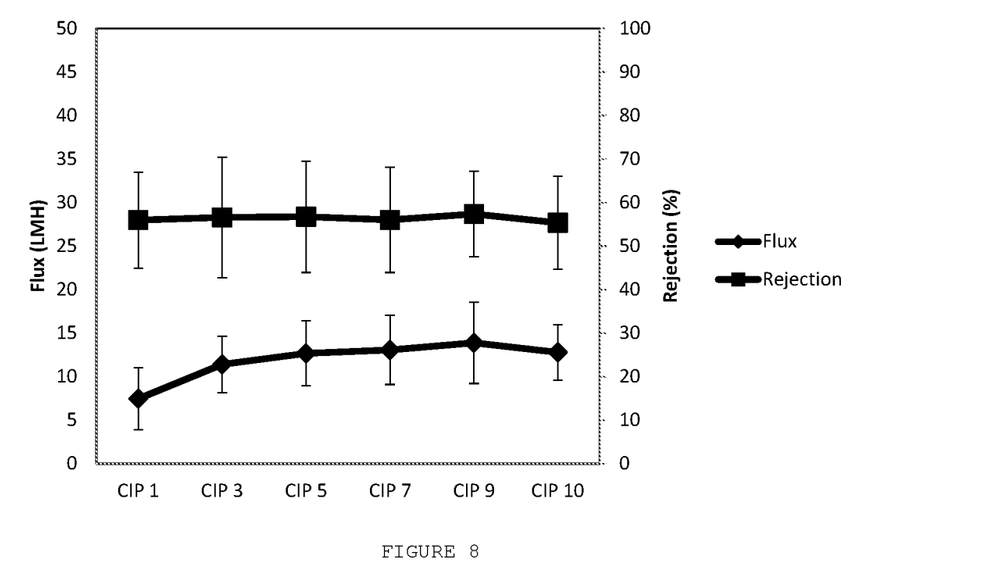
FIG. 8. Flux rate (♦) and rejection of sucrose (■) of monovalent salt, sodium chloride (NaCl) for a sample of the asymmetric composite membrane (Example 9) following repeated clean-in-place (CIP) protocols (Table 2).
Figure 9:
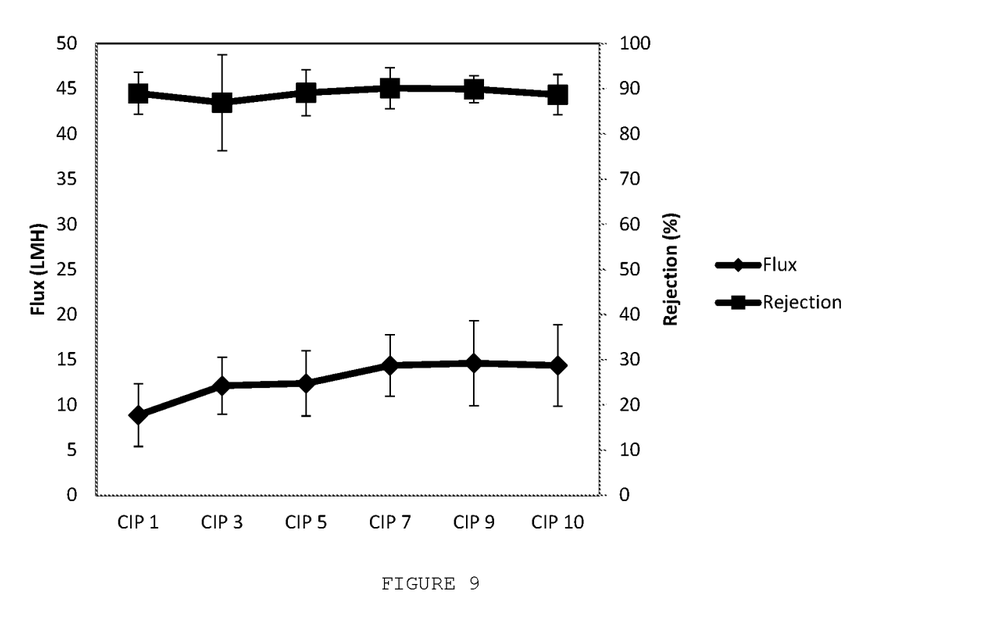
FIG. 9. Flux rate (♦) and rejection of sucrose (■) of divalent salt, magnesium sulfate ($MgSO_4$) for a sample of the asymmetric composite membrane (Example 9) following repeated clean-in-place (CIP) protocols (Table 2).

This sample of the asymmetric composite membrane exhibited initial rejections of 73% NaCl, 93% MgSO$_4$ and 92% sucrose. The flux was in the range 3 to 4 LMH, an improvement compared to Example 1A, Method II. The performance of the membrane after repeated CIP protocols is provided in FIGS. 6 and 7. The observed decline in the rejections may be attributed to the leaching of PVP from the polymer blend coating during repeated CIP protocols.

Example 6

This sample of the asymmetric composite membrane exhibited initial rejections of 88% NaCl, 100% MgSO$_4$ and 99% sucrose rejections. The membrane performed well during repeated CIP protocols until the fourth CIP protocol. At this stage the sample showed a sudden marked decrease in the rejection of MgSO$_4$ and sucrose (cf. Example 4).

TABLE 2

Clean-in-place (CIP) protocol employed for the assessment of samples of asymmetric composite membrane (Examples 7 to 9).

| Step | Wash | pH | Time (min) | Temperature (° C.) |
|---|---|---|---|---|
| 1 | Water | 6-7 | 5 | 24 ± 3 |
| 2 | Alkali (2% (w/w) NaOH) | 12 ± 0.5 | 5 | 31 ± 3 |
| 3 | Water | 12.1 ± 0.3 | 5 | 33 ± 2 |
| 4 | Acid (2% (w/w) HNO$_3$) | 2 ± 0.1 | 10 | 33 ± 3 |
| 5 | Water | 2.7 ± 0.3 | 5 | 26 ± 2 |
| 6 | Sodium Hypochlorite (200 ppm) | 12 ± 1 | 5 | 22 ± 2 |
| 7 | Water | 10 ± 1 | 5 | 21 ± 2 |
| 8 | Water | 6-7 | 5 | 20 ± 2 |

Example 7

The results (Table 3) are from a sample [#060716-2] that survived 10 CIP cycles.

TABLE 3

Flux (LMH) and salt rejection (%) determined following repeated CIP protocols for samples of asymmetric composite membrane prepared according to Example 7. All values determined at 20 Bar.

| | | Flux [rejection] | |
|---|---|---|---|
| | Flux DI | Sodium chloride (NaCl) | Magnesium sulfate (MgSO$_4$) |
| CIP 1 | 3.0 ± 0.1 | 6.4 ± 0.0 [53 ± 2] | 7.1 ± 0.0 [82.2 ± 0.4] |
| CIP 3 | | 7.1 ± 0.0 [53.6 ± 0.1] | 7.0 ± 0.1 [83.1 ± 0.1] |
| CIP 5 | | 7.6 ± 0.1 [50 ± 1] | 7.6 ± 0.1 [83.1 ± 0.1] |
| CIP 7 | | 7.9 ± 0.1 [50.0 ± 0.2] | 8.0 ± 0.0 [81 ± 1] |
| CIP 9 | | 8.5 ± 0.2 [52 ± 1] | 8.6 ± 0.0 [83.5 ± 0.2] |
| CIP 10 | | 9.3 ± 0.2 [50 ± 1] | 10.0 ± 0.2 [81 ± 2] |

Example 8

Membranes were subjected to 10 CIP cycles. The flux rate and rejection on 2 g/L (±~5%) salt solutions was monitored. The feed flowrate and temperature was 2±0.2 LPM and 16±3° C. respectively. Table 4 gives the results for three samples of the membrane: 140616-1, 140616-2 and 140616-3.

TABLE 4

Flux (LMH) and salt rejection (%) determined following repeated CIP protocols for samples of asymmetric composite membrane prepared according to Example 8. All values determined at 20 Bar.

| | | Flux [rejection] | |
|---|---|---|---|
| | Flux DI | Sodium chloride (NaCl) | Magnesium sulfate (MgSO4) |
| CIP 1 | 9 ± 3 | 7 ± 4 [56 ± 11] | 9 ± 3 [89 ± 5] |
| CIP 3 | | 11 ± 3 [57 ± 14] | 12 ± 3 [87 ± 11] |
| CIP 5 | | 13 ± 4 [57 ± 13] | 12 ± 4 [89 ± 5] |
| CIP 7 | | 13 ± 4 [56 ± 12] | 14 ± 3 [90 ± 5] |
| CIP 9 | | 14 ± 5 [57 ± 10] | 15 ± 5 [90 ± 3] |
| CIP 10 | | 13 ± 3 [55 ± 11] | 14 ± 4 [89 ± 4] |

Samples of the membrane (140616-1 and 140616-2) were retested after repeated drying to determine if the performance of the asymmetric composite membrane was adversely affected with either salt solution (MgSO$_4$) or milk as the feed stream.

TABLE 5

Flux (LMH) and salt rejection (%) determined for samples of the membrane (140616-1 and 140616-2) following drying with either a salt solution (Mg SO$_4$) or milk as the feed stream. All values determined at 20 Bar.

| | | Flux [rejection] | |
|---|---|---|---|
| | Flux DI | Magnesium sulfate (MgSO$_4$) | Milk |
| 1$^{st}$ Dry | 6 ± 1 | 6 ± 1 [93 ± 1] | 5 ± 1 [95 ± 1 (total solids)] [95 ± 6 (lactose)] |
| 2$^{nd}$ Dry | 10 ± 7 | 7 ± 2 [93 ± 2] | Not determined |

Example 9

The performance of a sample [#210815] of the asymmetric composite membrane prepared according to Example 9 was assessed. The results are presented in Table 6.

TABLE 6

Flux (LMH) and salt rejection (%) determined for various feed streams using a sample [#210815] of asymmetric composite membrane prepared according to Example 9 before and after a single CIP protocol. All values determined at 16 Bar.

| Flux | Flux [rejection] | | | | |
|---|---|---|---|---|---|
| | DI | NaCl | MgSO$_4$ | Sucrose | Milk |
| — | 1.7 ± 0.1 | 1.73 ± 0.03 [42] | 2.50 ± 0.01 [78] | 3 ± 10 [83 ± 2] | 2.0 ± 0.1 [93 ± 2] |
| CIP 1 | | 3.15 ± 0.02 [79] | 1.91 ± 0.03 [86 ± 1] | 4.00 ± 0.04 [94.5 ± 0.1] |

Comparative Examples

The performance of samples of membranes prepared omitting one or more of the steps employed in the preparation of the asymmetric composite membranes of Examples 1 to 9 was assessed (Table 7). Comparative Example 1 (C1) was prepared excluding the crosslinked (glutaraldehyde) from the solution of poly(vinyl alcohol). Comparative Example 2 (C2) was prepared using microporous poly(ethylene) hydrophilicitised by UV initiated grafting of 2-acrylamido-2-methylpropane sulfonic acid (AMPS) as the substrate, i.e. excluding the film of crosslinked, sulfonated poly(ether ether ketone) of the composite substrate used in the preparation of the asymmetric composite membranes of Examples 1 to 9. Comparative Example 3 (C3) was prepared with a single coating of the poly(vinyl alcohol) solution. Comparative Example 4 (C4) was prepared using an increased concentration (0.5 mL) of cross-linking agent (glutaraldehyde). Comparative Example 5 (C5) was a sample of composite substrate, i.e. excluding the poly(vinyl alcohol) coating.

TABLE 7

Flux (LMH) and salt rejection (%) determined for samples of the Comparative Examples. All values determined at 20 Bar.

| | | Flux [rejection] | |
|---|---|---|---|
| Comparative Example | Flux DI | Sodium chloride (NaCl) | Magnesium sulfate (MgSO$_4$) |
| C1 | 56 ± 39 | 48 ± 36 [19 ± 11] | 46 ± 28 [19 ± 10] |
| C2 | 108 ± 81 | 123 ± 57 [7 ± 5] | 120 ± 57 [10 ± 7] |
| C3 | 39 ± 13 | 31 ± 10 [45 ± 5] | 35 ± 10 [42 ± 3] |
| C4 | 8 ± 1 | 8 ± 1 [61 ± 1] | 9 ± 2 [83 ± 5] |
| C5 | 65 ± 6 | 45 ± 4 [35 ± 3] | 65 ± 15 [17 ± 1] |

Although the invention has been described with reference to embodiments or examples it should be appreciated that variations and modifications may be made to these embodiments or examples without departing from the scope of the invention. Where known equivalents exist to specific elements, features or integers, such equivalents are incorporated as if specifically referred to in this specification. In particular, variations and modifications to the embodiments or examples that include elements, features or integers disclosed in and selected from the referenced publications are within the scope of the invention unless specifically disclaimed. The advantages provided by the invention and discussed in the description may be provided in the alternative or in combination in these different embodiments of the invention.

INDUSTRIAL APPLICABILITY

The asymmetric composite membrane may be used in the recovery of water from feed streams. The method of preparing the asymmetric composite membrane is adaptable for use in a continuous manufacturing process.

REFERENCED PUBLICATIONS

Anon (2014) *DOW FILMTEC™ Membranes—Cleaning procedures for DOW FILMTEC FT30 elements* Tech Fact (Form No. 609-23010-0211).

Briggs et al (2015) *Durable asymmetric composite membrane* International Application No. PCT/NZ2015/050034 [Publ. No. WO 2015/147657 A1].

Childs et al (2006) *Composite material comprising layered hydrophilic coatings* U.S. patent application Ser. No. 11/238,642 [Publ. No. US 2006/0121217 A1].

Colquhoun et al (2010) *Chlorine tolerant, multilayer reverse-osmosis membranes with high permeate flux and high salt rejection* J. Mater. Chem. 20, 4629-4634.

Drioli et al (2003) *Sulfonated PEEK-WC membranes for possible fuel cell applications* Journal of Membrane Science 228 (2004) 139-148.

Exley (2016) *Asymmetric composite membranes and modified substrates used in their preparation* International Application No. PCT/IB2015/060001 [Publ. No. WO 2016/103239 A1].

He et al (2008) *Preparation and characterization of nanofiltration membranes by coating polyethersulfone hollow fibers with sulfonated poly(ether ether ketone) (SPEEK)* Journal of Membrane Science 3007, 62-72.

Loeb (1981) *The Loeb-Sourirajan membrane: How it came about* In Synthetic Membranes: Turbak, A.; ACS Symposium Series, American Chemical Society, Washington D.C.

Luo et al (2012) *Double cross-linked polyetheretherketone proton exchange membrane for fuel cell* International Journal of Hydrogen Energy 37, 6148-6152.

McCutcheon and Wang (2012) Desalination 312, 1.

Mika et al (2005) *Stable composite material comprising supported porous gels* International Application No. PCT/CA2005/000880 [Publ. No. WO 2005/120701 A1].

Nymeijer et al (2014) *Super selective membranes in gas-liquid membrane contactors for olefin/paraffin separation* Journal of Membrane Science 232, 107-114.

Petersen (1993) *Composite reverse osmosis and nanofiltration membranes* Journal of Membrane Science, 83, 81-150.

Rhoden et al (2011) *Low equivalent weight Friedel-Crafts cross-linked sulfonated poly(ether ether ketone)* Journal of Membrane Science 376, 290-301.

The invention claimed is:

1. An asymmetric composite membrane comprising:
   (a) a sheet of microporous polyolefin hydrophilicitized by grafting with a first hydrophilicitizing agent;
   (b) a film of sulfonated poly(ether ether ketone) cross-linked with a first crosslinking agent and adhered to the sheet; and
   (c) a coating of poly(vinyl alcohol) cross-linked with a second cross-linking agent adhered to the film.

2. The membrane of claim 1 where the polyolefin is poly(ethylene).

3. The membrane of claim 1 where the first cross-linking agent comprises divinylbenzene.

4. The membrane of claim 1 where the second cross-linking agent comprises glutaraldehyde.

5. The membrane of claim 1 where the first hydrophilicitizing agent is selected from the group consisting of: 2-acrylamido-1-methyl-2-propanesulfonic acid (AMPS) and 4-ethenyl-benzenesulfonic acid (SSS).

6. The membrane of claim 5 where the first hydrophilicitizing agent is 4-ethenyl-benzenesulfonic acid (SSS).

7. The membrane of claim 4 where the second cross-linking agent additionally comprises a second hydrophilicitizing agent.

8. The membrane of claim 7 where the second hydrophilicitizing agent is selected from the group consisting of: 2-hydroxyethyl 2-methyl-2-propenoic acid ester (HEMA); 4-ethenyl-benzenesulfonic acid (SSS); and allyl oxy-ethanol (AOE).

9. The membrane of claim 8 where the second hydrophilicitizing agent is 2-hydroxyethyl 2-methyl-2-propenoic acid ester (HEMA).

10. An asymmetric composite membrane consisting essentially of:
    (a) a sheet of hydrophilicitized microporous poly(ethylene) grafted with 4-ethenyl-benzenesulfonic acid (SSS);
    (b) a film of sulfonated poly(ether ether ketone) cross-linked with divinylbenzene and adhered to the sheet; and
    (c) a coating of poly(vinyl alcohol) cross-linked with glutaraldehyde and adhered to the film.

* * * * *